(12) United States Patent
Hasegawa et al.

(10) Patent No.: US 10,197,187 B2
(45) Date of Patent: Feb. 5, 2019

(54) FLUID CONTROL VALVE

(71) Applicant: MITSUBISHI ELECTRIC CORPORATION, Tokyo (JP)

(72) Inventors: Satoru Hasegawa, Tokyo (JP); Katsunori Takai, Tokyo (JP); Naoki Ihana, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/329,544

(22) PCT Filed: Oct. 31, 2014

(86) PCT No.: PCT/JP2014/079107
§ 371 (c)(1),
(2) Date: Jan. 26, 2017

(87) PCT Pub. No.: WO2016/067465
PCT Pub. Date: May 6, 2016

(65) Prior Publication Data
US 2017/0211722 A1 Jul. 27, 2017

(51) Int. Cl.
*F16K 27/02* (2006.01)
*F16K 49/00* (2006.01)
(Continued)

(52) U.S. Cl.
CPC .............. *F16K 49/005* (2013.01); *F16K 1/22* (2013.01); *F16K 27/02* (2013.01);
(Continued)

(58) Field of Classification Search
CPC .............. F16L 59/161; Y10T 137/6525; Y10T 137/6579
(Continued)

(56) References Cited

U.S. PATENT DOCUMENTS 5,351,935 A * 10/1994 Miyoshi ................. F02M 26/54
251/129.05
5,680,880 A 10/1997 Miyake et al.
(Continued)

FOREIGN PATENT DOCUMENTS

JP          53-63650 A    6/1978
JP          8-4932 A      1/1996
(Continued)

*Primary Examiner* — Mary McManmon
*Assistant Examiner* — Richard K Durden
(74) *Attorney, Agent, or Firm* — Birch, Stewart, Kolasch & Birch, LLP

(57) ABSTRACT

A fluid control valve includes a valve-side housing and an actuator-side housing. The valve-side housing includes a first facing plane portion that faces a second facing plane portion of the actuator-side housing and a first connection portion arranged at an outer side region of the first facing plane portion. The actuator-side housing includes the second facing plane portion and a second connection portion arranged at an outer side region of the second facing plane portion. The valve-side housing and the actuator-side housing are connected to each other via the first connection portion and the second connection portion such that a space is provided between the first facing plane portion and the second facing plane portion. The first facing plane portion of the valve-side housing includes a depression portion that is recessed in a direction away from the second facing plane portion of the actuator-side housing.

6 Claims, 3 Drawing Sheets

(51) Int. Cl.
*F16K 1/22* (2006.01)
*F02M 26/70* (2016.01)
*F02M 26/52* (2016.01)
*F02M 26/72* (2016.01)

(52) U.S. Cl.
CPC ......... *F16K 27/0218* (2013.01); *F02M 26/52* (2016.02); *F02M 26/70* (2016.02); *F02M 26/72* (2016.02)

(58) Field of Classification Search
USPC .................................................. 137/338, 340
See application file for complete search history.

(56) References Cited

U.S. PATENT DOCUMENTS

| | | | |
|---|---|---|---|
| 6,089,536 | A | 7/2000 | Watanabe et al. |
| 6,672,293 | B1 | 1/2004 | Yokoyama et al. |
| 2007/0240690 | A1 | 10/2007 | Nanba |
| 2012/0313025 | A1 | 12/2012 | Takai et al. |
| 2014/0252259 | A1* | 9/2014 | Yokoyama ............... F16K 1/224 251/305 |

FOREIGN PATENT DOCUMENTS

| | | | | |
|---|---|---|---|---|
| JP | 8-182256 | A | 7/1996 | |
| JP | 10-82349 | A | 3/1998 | |
| JP | 2007-285311 | A | 11/2007 | |
| JP | 2008-196437 | A | 8/2008 | |
| JP | 2011-37051 | A | 2/2011 | |
| WO | WO 2012/001737 | A1 | 1/2012 | |
| WO | WO 2016119927 | A1 * | 8/2016 | ............ F02B 37/186 |

* cited by examiner

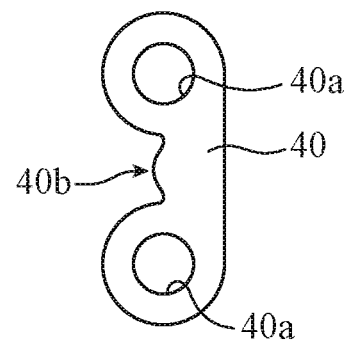
FIG.5A
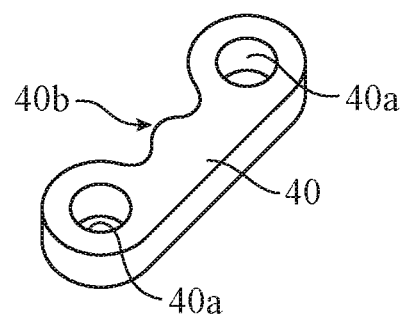
FIG.5B
FIG.6
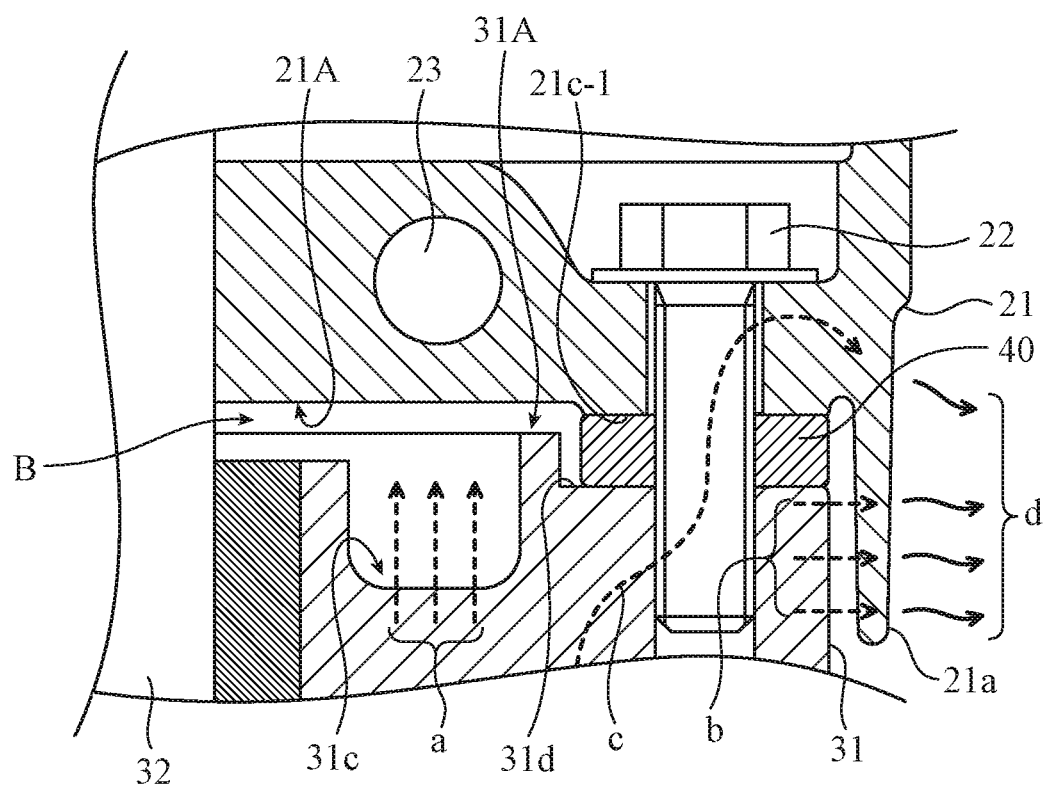

FLUID CONTROL VALVE

TECHNICAL FIELD

The present invention relates to a fluid control valve that is to be disposed in a conduit in which a high temperature fluid flows.

BACKGROUND ART

As a fluid control valve, a valve such as an exhaust gas recirculation valve is known. The exhaust gas recirculation valve is used in a system in which exhaust gas is circulated and returned to the gas intake side. When this exhaust gas recirculation valve is used to deal with high temperature exhaust gas having a temperature about 800 degrees Celsius, the exhaust gas recirculation valve needs to be configured such that the heat of the exhaust gas is not transmitted to components whose heat-resistant temperature is low and that are included in the actuator unit for driving the valve, as much as possible.

For example, in an exhaust gas recirculation valve disclosed in Patent Literature 1, to protect an actuator unit from heat of exhaust gas having a high temperature a housing that is one of elements constituting a valve main body includes a first housing having an exhaust gas passage and a second housing having a coolant passage.

Moreover, the first housing is made of metal material having higher stiffness or strength at a heated atmosphere than material for the second housing. In addition, the second housing is cooled by coolant fluid for an engine circulating through the coolant passage formed in the second housing. Moreover, a contact area between the first housing and the second housing is reduced as long as possible, and a thermal insulating layer of air is provided between the first housing and the second housing.

Patent Literature 2 discloses an exhaust gas recirculation valve. The exhaust gas recirculation valve has an integrated structure in which an output shaft of an actuator unit is directly gear-engaged with a valve shaft. In this valve, a housing protection component having a cylindrical shape is press-fitted within an exhaust gas passage.

The housing protection component is a component that protects a housing against heat of exhaust gas. Between a part of the housing protection component and a surface of the exhaust gas passage, a thermal insulating layer for reducing heat conduction is provided.

An exhaust gas recirculation valve disclosed in Patent Literature 3 includes a valve-side housing and an actuator-side housing. The valve-side housing has a fluid passage. The actuator-side housing, to which an actuator unit is attached, serves as a gearbox that transmits a rotational driving force to a valve shaft.

The actuator-side housing and the valve-side housing are connected such that a space is provided between them. The space functions as a thermal insulating layer of air. The thermal insulating layer of air suppresses influence of radiant heat from the valve-side housing.

In addition, a coolant passage is formed in the actuator-side housing. The coolant passage reduces heat transfer to a gear mechanism and the actuator unit by its cooling effect.

CITATION LIST

Patent Literature

Patent Literature 1: Japanese Unexamined Patent Application Publication No. 2008-196437

Patent Literature 2: Japanese Unexamined Patent Application Publication No. 2007-285311

Patent Literature 3: International Patent Application Publication No. 2012/001737

SUMMARY OF INVENTION

Technical Problem

The valves disclosed in Patent Literature 1 and Patent Literature 2 are considered to be usable if a total amount of heat is small. That is, even if the exhaust gas has a high temperature, if a flow rate of the exhaust gas is small and a total amount of heat is small, the valves are considered to be usable.

However, if the diameter of the valves disclosed in Patent Literature 1 and Patent Literature 2 is enlarged and used for controlling a large flow of fluid, an amount of heat conduction to the actuator unit and an amount of radiant heat to the actuator unit become large. Thus, thermal insulation properties of the valves are likely to be insufficient. Especially, regarding the valve disclosed in Patent Literature 1, the actuator unit is accommodated in the second housing, and is located beside the first housing. So, influence of the heat conduction and influence of the radiant heat are likely to be easily increased when the amount of heat becomes large.

Regarding the valve disclosed in Patent Literature 2, the thermal insulating layer is formed only in a region between the part of the housing protection component and the wall surface of the exhaust gas passage. So, heat resistant properties will be insufficient for a large flow rate of fluid if the total amount of the heat is large because of the large flow rate.

On the other hand, regarding the valve disclosed in Patent Literature 3, the actuator unit is provided separately from the actuator-side housing, and the actuator-side housing is arranged between the actuator unit and the valve-side housing. In addition, cooling is performed by flowing the coolant fluid through the coolant passage of the actuator-side housing. Thus, temperatures of the gear mechanism and the actuator unit are not likely to exceed the heat-resistant temperatures of the gear mechanism even if the valve of Patent Literature 3 is used for a large flow rate of fluid with a high temperature.

However, regarding the valve disclosed in Patent Literature 3, normal cooling effect can be obtained only when the coolant fluid circulates through the coolant passage. So, when cooling effect generated by the coolant passage is reduced, there exists a possibility that the heat resistant properties of the actuator-side housing are insufficient depending on an operational environment.

For example, let us assume that the valve disclosed in Patent Literature 3 is applied to the exhaust gas recirculation valve. When a vehicle engine stops its operation, circulation of the exhaust gas having a high temperature is stopped and heat input from the exhaust gas is stopped. However, since circulation of the coolant fluid through the coolant passage is also stopped, the cooling effect is reduced.

In this case, in the valve disclosed in Patent Literature 3, temperature of the valve-side housing remains high due to residual heat of the valve-side housing especially when temperature of the exhaust gas and temperature around the valve are high. This residual heat causes temperature of the actuator-side housing to rise. Thus, there exists a possibility that temperatures of the gear mechanism and the actuator unit exceed the heat-resistant temperatures of the gear mechanism and the actuator unit.

The present invention is made in order to solve the above-mentioned problem, and it is therefore an object of the present invention to provide a fluid control valve that has an improved resistance to residual heat of a housing.

Solution to Problem

A fluid control valve in accordance with the present invention includes: a first housing including a fluid passage; a valve provided in the first housing and configured to open or close the fluid passage; an actuator unit for generating a driving force to open or close the valve; and a second housing to which the actuator unit is attached and including a coolant passage through which a coolant fluid circulates. In this fluid control valve, the first and second housings each include a facing plane portion facing one another and a connection portion disposed at an outer side region of the facing plane portion, the facing plane portions are connected to each other via the connection portions and a thermal insulating member with a space provided therebetween, the facing plane portion of the first housing includes a depression portion that is recessed in a direction away from the facing plane portion of the second housing, and a part of the thermal insulating member has a depressed shape at a region in which the thermal insulating member is in contact with the connection portions.

Advantageous Effects of Invention

According to the present invention, there is provided an advantageous effect that the resistance to the residual heat of the housing which has been heated by the fluid having a high temperature is improved.

BRIEF DESCRIPTION OF DRAWINGS

FIGS. 5A and 5B are a diagram illustrating a thermal insulating plate;
and
FIG. 6 is a conceptual diagram illustrating influence of heat of fluid to the fluid control valve in accordance with Embodiment 1.

DESCRIPTION OF EMBODIMENTS

Hereinafter, embodiments will be explained in detail with reference to the drawings.

Embodiment 1

Figure 1:
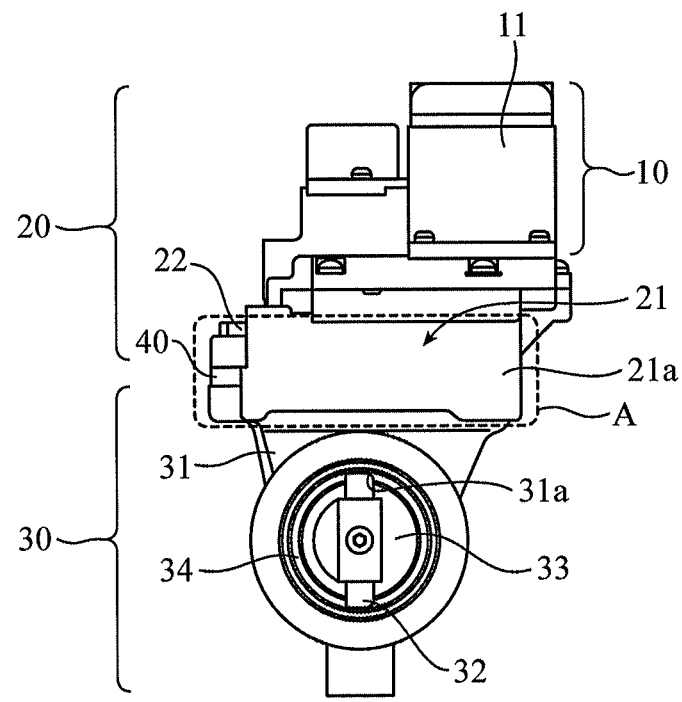
FIG. 1 is a diagram illustrating a fluid control valve in accordance with Embodiment 1.

FIG. 1 is a diagram illustrating a fluid control valve in accordance with Embodiment 1. In FIG. 1, the fluid control valve of Embodiment 1 is applied to an exhaust gas recirculation valve (hereinafter referred to as "EGR valve"), which is used in a system in which an engine exhaust gas is circulated and returned to the intake passage. The EGR valve shown in FIG. 1 is a valve of butterfly type. A valve 33 opens or closes an exhaust gas passage 34 by rotating with a valve shaft 32 integrally. As a configuration for rotating them, the fluid control valve includes an actuator unit 10, a driving force transmitting unit 20, and a valve unit 30.

The actuator unit 10 includes a motor 11, and generates a rotational driving force for opening or closing the valve 33. An output shaft of the motor 11 is connected to a gear mechanism disposed in the driving force transmitting unit 20.

The driving force transmitting unit 20 includes the gear mechanism and an actuator-side-housing 21 for accommodating the gear mechanism. The output shaft of the motor 11 and the valve shaft 32 are coupled to each other via the gear mechanism. Thus, the rotational driving force of the motor 11 is transmitted to the valve shaft 32 via the gear mechanism.

For example, a pinion gear attached to the output shaft of the motor 11 and a gear attached to the valve shaft 32 are engaged with each other. Thus, the rotational driving force of the motor 11 is directly transmitted to the valve shaft 32.

The actuator-side housing 21 is an example of a second housing of this disclosure. As shown in FIG. 1, the actuator unit 10 is attached to the actuator-side housing 21, and an extension wall 21a is formed in the actuator-side housing 21. The actuator-side housing 21 is made of, for example, cast metal having high thermal conductivity such as aluminum. The actuator-side housing 21 is connected to an upper portion of a valve-side housing 31 to reduce influence of radiant heat from the valve-side housing 31.

The valve unit 30 is connected to a conduit in which exhaust gas having high temperature flows, and controls a flow rate of the exhaust gas by opening or closing the valve 33. The valve-side-housing 31 constituting a part of the valve unit 30 is an example of a first housing of this disclosure, and made of heat-resisting steel, such as cast iron or stainless steel. In the valve-side-housing 31, the exhaust gas passage 34 is provided.

In addition, the valve-side-housing 31 is provided with a through-hole 31a through which the exhaust gas passage 34 communicates with the outside of the valve-side-housing 31. In the through-hole 31a, the valve shaft 32 is inserted. The valve 33 rotates integrally with the valve shaft 32, and opens or closes the exhaust gas passage 34.

The actuator-side housing 21 and the valve-side housing 31 are connected to each other by a bolt 22 via a thermal insulating plate 40. Hereinafter, a structure in which the actuator-side housing 21 and the valve-side housing 31 are connected to each other via the thermal insulating plate 40 will be explained. However, the invention is not limited to this structure; it is possible to adopt a structure in which the actuator-side housing 21 and the valve-side housing 31 are connected to each other without using the thermal insulating plate 40.

Figure 2:
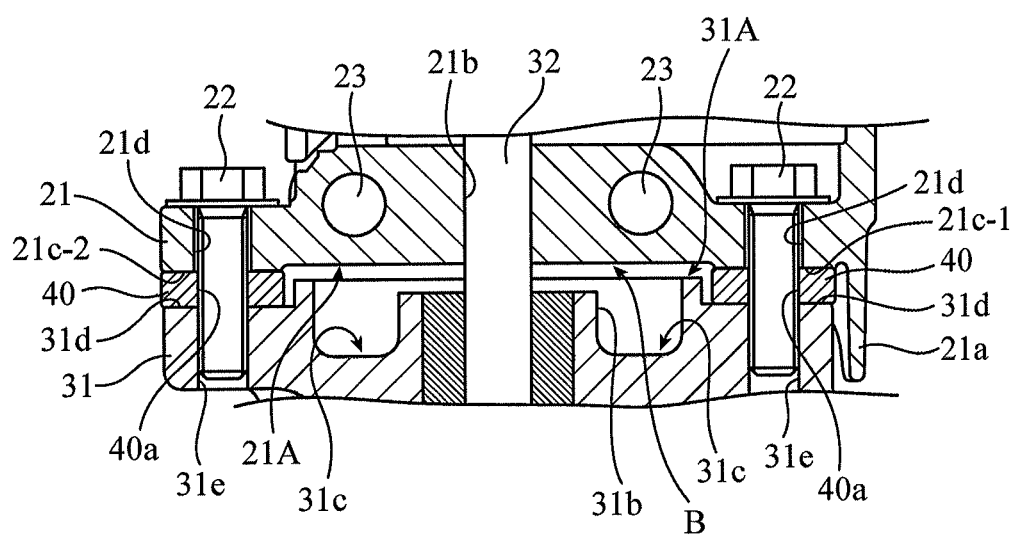
FIG. 2 is an enlarged cross-sectional view of a portion A shown in FIG. 1.
Figure 3:
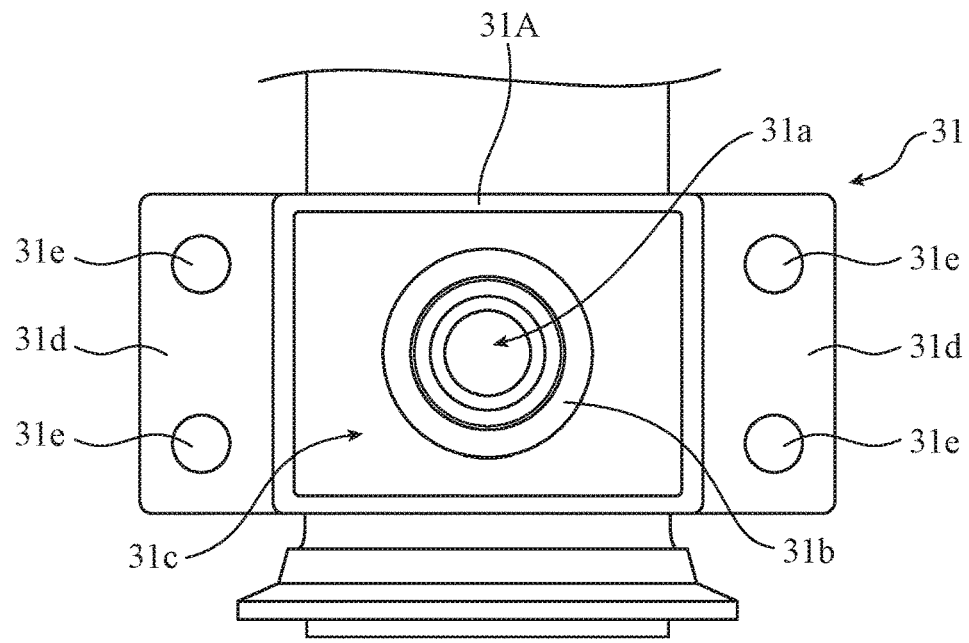
FIG. 3 is a diagram illustrating a valve-side housing.
Figure 4:
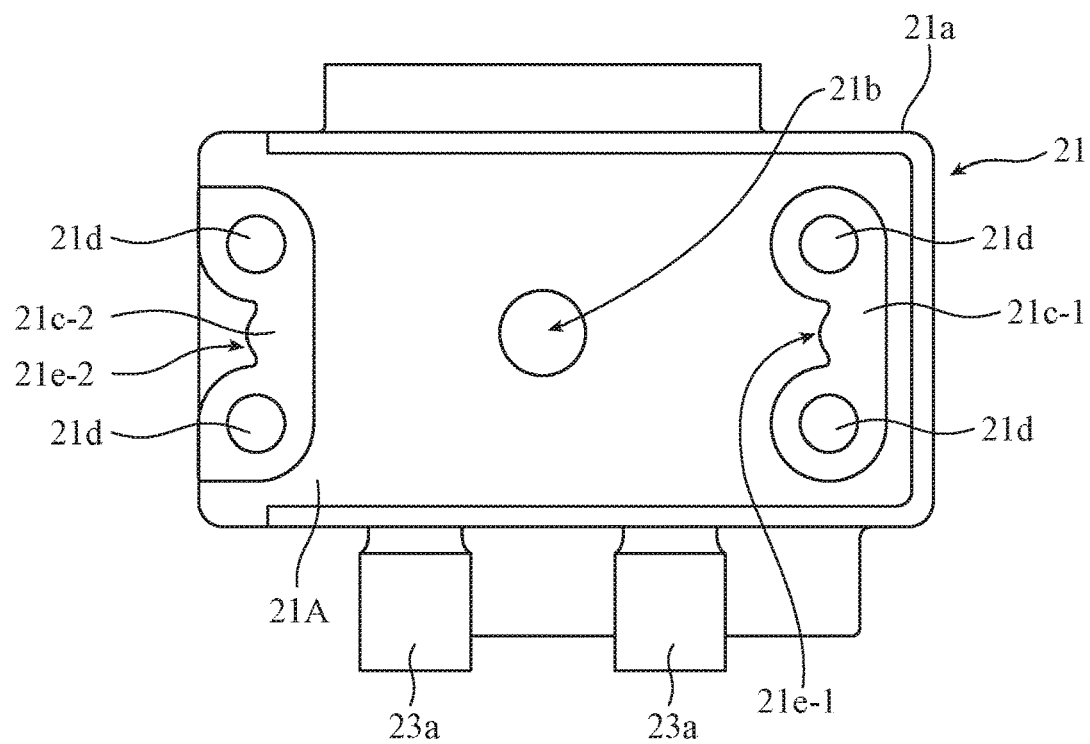
FIG. 4 is a diagram illustrating an actuator-side housing.

FIG. 2 is an enlarged cross-sectional view of a portion A shown in FIG. 1, which is taken along an axial direction of the valve shaft. FIG. 3 is a diagram illustrating a valve-side housing 31. In FIG. 3, the valve-side housing 31 is viewed from a side of a plane that faces the actuator-side housing 21. FIG. 4 is a diagram illustrating the actuator-side housing 21. In FIG. 4, the actuator-side housing 21 is viewed from a side of a plane that faces the valve-side housing 31. FIG. 5 is a diagram illustrating the thermal insulating plate 40. FIG. 5A is a plan view of the thermal insulating plate 40, and FIG. 5B is a perspective view of the thermal insulating plate 40.

In the actuator-side housing 21, there is provided a through-hole 21b that extends to the valve unit 30. The valve shaft 32 is inserted in the through-hole 21b.

The extension wall 21a is a wall portion that extends from an outer peripheral portion of the facing plane portion 21A of the actuator-side housing 21 along a lateral side of the valve unit 30. The extension wall 21a covers an upper end portion of the valve-side housing 31. The extension wall 21a functions as a heatsink that dissipates a part of heat that has been transmitted from the valve-side housing 31 to the actuator-side housing 21.

In the actuator-side housing 21, connection portions 21c-1, 21c-2 are provided on the facing plane portion 21A that faces the valve-side housing 31. As shown in FIG. 2, the connection portions 21c-1, 21c-2 project from the facing plane portion 21A toward the valve unit 30. In both the connection portions 21c-1, 21c-2, there are formed boltholes 21d for receiving the bolts 22.

In the valve-side housing 31, there are provided connection portions 31d, 31d at outer side regions of the facing plane portion 31A that faces the actuator-side housing 21. Each connection portion 31d includes threaded holes 31 that engage with the bolts 22.

As shown in FIG. 2, the valve-side housing 31 is connected to the actuator-side housing 21 via the connection portion 31d in such a way that a space B is provided between the valve-side housing 31 and the actuator-side housing 21. That is, the actuator-side housing 21 and the valve-side housing 31 are connected to each other only at connecting parts, each of which includes the connection portion 21c-1 or 21c-2, the connection portion 31d overlapped with the connection portion 21c-1 or 21c-2, and the bolt fastening the connection portion 21c-1 or 21c-2 and the connection portion 31d. Hereinafter, this connecting part is referred to as "a connecting part via the connection portion 31d".

As shown in FIG. 3, the connection portion 31d are arranged at the outer side regions of the facing plane portion 31A that faces the actuator-side housing 21. Thereby, the connecting parts via the connection portions 31d are located at side portions of the valve-side housing 31 and face outside. Thus, heat can be dissipated from this region facing outward.

Further, because the connection portion 31d is arranged at the outer side regions of the facing plane portion 31A, the connecting part via the connection portion 31d is located close to the extension wall 21a when the actuator-side housing 21 and the valve-side housing 31 are connected to each other. Consequently, the extension wall 21a can effectively dissipate the heat received from the above-mentioned connecting part.

Note that although the extension wall 21a is not provided around the connection portion 21c-2 in FIG. 4, the invention is not limited to the illustrated example. That is, the extension wall 21a may be provided around the connection portion 21c-2 such that the extension wall 21a entirely surrounds the upper end portion of the valve-side housing 31.

Moreover, the connecting part via the connection portion 31d may include the thermal insulating plate 40.

As shown in FIG. 5, the thermal insulating plate 40 is a plate-shaped member having a bolt-hole 40a. The thermal insulating plate 40 is made of metal having low thermal conductivity such as stainless steel.

The actuator-side housing 21 and the valve-side housing 31 are connected to each other with the bolt 22 in a state in which the thermal insulating plate 40 is sandwiched between the connection portion 21c-1 or 21c-2 and the connection portion 31d. By interposing the thermal insulating plate 40, heat transfer resistance is increased at the connecting part via the connection portion 31d. Thus, it is possible to suppress heat transfer to the actuator-side housing 21 from the valve-side housing 31.

Further, a depression portion 31c is formed in the facing plane portion 31A of the valve-side housing 31. The depression portion 31c is recessed in a direction away from the facing plane portion 21A of the actuator-side housing 21. Thus, a gap between the actuator-side housing 21 and the valve-side housing 31 becomes large.

The larger the gap between the actuator-side housing 21 and the valve-side housing 31 is, the thicker thermal insulating layer of air becomes. Thereby, the heat transfer resistance is increased. Consequently, it is possible to reduce the heat transfer caused by the radiant heat from the valve-side housing 31.

For example, the depression portion 31c may be formed so as to be recessed deeper than the connection portion 31d. In this case, since a sufficient thermal insulating layer of air is formed between the depression portion 31c and the facing plane portion 21A, it is effective for thermal insulation.

Furthermore, the connection portions 21c-1, 21c-2 of the actuator-side housing 21 may be formed such that apart of connection portion 21c-1 or 21c-2 is cut out to reduce a contact area with the connection portion 31d or the thermal insulating plate 40.

For example, as shown in FIG. 4, when cutout portions 21e-1, 21e-2 are formed, contact areas between the connection portions 21c-1, 21c-2 and the connection portion 31d or the thermal insulating plate 40 are reduced. Thus, the heat transfer resistance is increased. Consequently, it is possible to reduce the heat transfer from the valve-side housing 31 to the actuator-side housing 21.

Moreover, the thermal insulating plate 40 may be formed such that a part of the thermal insulating plate 40 is cut out to reduce contact areas with the connection portions 21c-1, 21c-2 and the connection portion 31d.

For example, as shown in FIG. 5, when the cutout portion 40b is formed, the contact areas between the thermal insulating plate 40 and the connection portions, which include the connection portions 21c-1, 21c-2 and the connection portion 31d, are reduced. Thus, the heat transfer resistance is increased.

When at least one of the connection portions 21c-1, 21c-2 and the thermal insulating plate 40 is cut out, the heat transfer resistance is increased. However, a support area at the connecting part via the connection portion 31d is also reduced.

Under operating environment of the actual EGR valve, there is a case in which a fastening force by the bolt is reduced due to, for example, a difference in thermal expansion coefficient between components used in the above-mentioned connecting part. So, it is necessary to ensure a sufficient support force at the above-mentioned connecting part.

Accordingly, in this disclosure, at least one of the connection portions 21c-1, 21c-2 and the thermal insulating plate 40 is cut out such that the contact areas are minimized under conditions that the required support area is ensured considering the operating environment of the EGR valve.

Thereby, it is possible to increase the heat transfer resistance, while the support force at the connecting part via the connection portion 31d is ensured.

As shown in FIG. 2, in the actuator-side housing 21, there is formed a coolant passage 23 through which coolant fluid circulates. Note that the actuator-side housing 21 is made of metal having high thermal conductivity such as aluminum to enhance the cooling effect. Thereby, it is possible to effectively cool the actuator-side housing 21 such that the heat to be transferred to the gear mechanism and the actuator unit 10 is reduced, even when the exhaust gas having a high temperature (up to 800 degrees Celsius) flows through the exhaust gas passage 34 at a high flow rate and heats the valve unit 30.

In the coolant passage 23, the coolant fluid is circulated by driving an electric pump in accordance with an operation of a vehicle engine. For example, the coolant fluid is flowed into the coolant passage 23 via one of passage openings 23a shown in FIG. 4 and is flowed out from the coolant passage 23 via the other of the passage openings 23a. After cooled by a radiator, the coolant fluid is flowed into the coolant passage 23 again. When the vehicle engine is stopped, the electric pump is also stopped. Thus, the circulation of the coolant fluid through the coolant passage 23 is also stopped.

FIG. 6 is a conceptual diagram illustrating influence of heat of fluid in the fluid control valve in accordance with Embodiment 1. In FIG. 6, the fluid control valve in accordance with Embodiment 1 is applied to the EGR valve shown in FIG. 1. When the exhaust gas having a high temperature (up to 800 degrees Celsius) circulates through the exhaust gas passage 34, the valve unit 30 is heated by heat input from the exhaust gas. At this time, the radiant heat from the facing plane portion 31A is generated and the heat transfer through the connection portion 31d are induced at the valve-side housing 31.

Since the actuator-side housing 21 is connected to the valve-side housing 31 such that the space B is provided between them, the radiant heat transferred from the facing plane portion 31A to the actuator-side housing 21 is reduced by the thermal insulating layer of air at the space B. Even when a portion on the side of the facing plane portion 21A of the actuator-side housing 21 is heated by the radiant heat from the facing plane portion 31A or the heat transfer via the air at the space B and via the connection portion 31d, the portion is cooled by the coolant fluid circulating through the coolant passage 23.

When the vehicle engine stops, the circulation of the exhaust gas through the exhaust gas passage 34 is stopped and the heat input from the exhaust gas to the valve unit 30 is also stopped. Further, since the circulation of the coolant fluid through the coolant passage 23 is stopped, the cooling effect by the coolant passage 23 is reduced.

On the other hand, just after the engine stops, there exists residual heat of the valve-side housing 31, which has been heated by the exhaust gas having a high temperature. So, generation of the radiant heat from the facing plane portion 31A and the heat transfer via the connection portion 31d continue. Thus, the portion on the side of the facing plane portion 21A of the actuator-side housing 21 is continuously heated, while the cooling effect by the coolant passage 23 is reduced. Consequently, there is a possibility that temperatures of the gear mechanism and the actuator unit 10 exceed heat-resistant temperatures of the gear mechanism and the actuator unit 10 in the actuator-side housing 21 especially when temperature of the exhaust gas and temperature around the valve are high.

Accordingly, in this disclosure, the depression portion 31c is formed in the facing plane portion 31A, and the connection portions 21c-1, 21c-2, 31d are provided at the outer side regions of the facing plane portions 21A, 31A. In addition, the actuator-side housing 21 is connected to the valve-side housing 31 via the connection portions 21c-1, 21c-2, 31d such that the space B is provided between the facing plane portion 21A and the facing plane portion 31A. Thereby, the transfer of the residual heat in the valve-side housing 31 to the actuator-side housing 21 can be suppressed. Thus, resistance to the residual heat of the valve-side housing 31 is improved.

More specifically, since the connection portion 31d is provided at the outer side region of the facing plane portion 31A in the valve-side housing 31, the connecting part via the connection portion 31d is located at the side portion of the valve-side housing 31 and faces outside. Thereby, the connecting part via the connection portion 31d can dissipate the heat from the region that faces outside toward the atmosphere.

In addition, when the actuator-side housing 21 and the valve-side housing 31 are connected to each other, the connecting part via the connection portion 31d is located close to the extension wall 21a. In this case, the extension wall 21a covers the above-mentioned connecting part as shown in FIG. 6, and the extension wall 21a functions as the heatsink. That is, the extension wall 21a can dissipate the heat, including radiant heat b from the outer side region of the facing plane portion 31A and the conduction heat c conducted via the connection portion 31d, as radiation heat d toward the atmosphere.

Moreover, since the depression portion 31c is formed in the facing plane portion 31A, the gap between the actuator-side housing 21 and the valve-side housing 31 is large compared to the case in which the gap is defined only by the space B. Thereby, the space between the depression portion 31c and the facing plane portion 21A of the actuator-side housing 21 functions as the thermal insulating layer of air. Thereby, the heat transfer resistance is increased. Thus, an amount of the heat transfer to the actuator-side housing 21 caused by the radiant heat a is reduced compared to the case in which the gap is defined only by the space B.

Furthermore, when the thermal insulating plate 40 is provided in the connecting part via the connection portion 31d, the heat transfer resistance is increased. Thus, it is possible to suppress the conduction heat c via the connection portion 31d.

In addition, when a part of at least one of the connection portions 21c-1, 21c-2 of the actuator-side housing 21 and the thermal insulating plate 40 is cut out, the heat transfer resistance is increased.

Note that it is possible to further increase the heat transfer resistance at the connecting part via the connection portion 31d by combining the thermal insulating plate 40 and the above-mentioned cutout.

In the explanation above, the case in which the fluid control valve according to the disclosure is a valve for the fluid having a high temperature flowing at a high flow rate is explained. However, the fluid control valve in this disclosure can be applied to a valve for fluid flowing at a low flow rate or fluid having a low temperature, That is, the fluid control valve in this disclosure can be applied to various valves regardless of fluid temperature or a flow rate. For example, the fluid control valve in this disclosure can be applied to the valve disclosed in Patent Literature 3.

As explained above, according to Embodiment 1, the valve-side housing 31 includes the facing plane portion 31A, which faces the facing plane portion 21A, and the connection portion 31d disposed at the outer side region of the facing plane portion 31A. The actuator-side housing 21 includes the facing plane portion 21A, which faces the facing plane portion 31A, and the connection portions 21c-1, 21c-2 disposed at the outer side regions of the facing plane portion 21A. The facing plane portion 31A and the facing plane portion 21A are connected to each other via the connection portions 31d, 21c-1, 21c-2 such that the space B is provided between the facing plane portion 21A and the facing plane portion 21A. In addition, the facing plane portion 31A of the valve-side housing 31 includes the depression portion 31c that is recessed in the direction away from the facing plane portion 21A of the actuator-side housing 21.

With the depression portion 31c, the heat transfer resistance between the depression portion 31c and the actuator-side housing 21 is increased, and the amount of the heat transfer to the actuator-side housing 21 itself is reduced. Thereby, the resistance to the residual heat of the valve-side housing 31 is improved.

In addition, according to Embodiment 1, the EGR valve includes the thermal insulating plate 40 in the connecting part via the connection portion 31d. With the thermal insulating plate 40, the heat transfer resistance at the above-mentioned connecting part is increased. Thus, it is possible to suppress the heat transfer to the actuator-side housing 21 from the valve-side housing.

Further, according to Embodiment 1, the actuator-side housing 21 includes the extension wall 21a extending from the outer peripheral portion of the facing plane portion 21A that faces the valve-side housing 31. The extension wall 21a covers the upper end portion of the valve-side housing 31. The extension wall 21a functions as the heatsink that dissipates the heat that has been received from the valve-side housing 31. Thereby, it is possible to improve the resistance to the residual heat of the valve-side housing 31.

Furthermore, according to Embodiment 1, a part of the connection portions 21c-1, 21c-2 is cut out. With this cutout portion, the contact area of the connection portions 21c-1, 21c-2 is reduced. Thereby, the heat transfer resistance at the above-mentioned connecting part is increased. Thus, it is possible to suppress the heat transfer to the actuator-side housing 21 from the valve-side housing.

Moreover, according to Embodiment 1, a part of the thermal insulating plate 40 is cut out to reduce the contact area with the connection portion 31d. With this cutout portion, the contact area of the thermal insulating plate 40 is reduced. Thereby, the heat transfer resistance at the above-mentioned connecting part is increased. Thus, it is possible to suppress the heat transfer to the actuator-side housing 21 from the valve-side housing.

In Embodiment 1, the butterfly valve is exemplified as the fluid control valve according to this disclosure. However, the fluid control valve is not limited to the butterfly valve. For example, the invention can be applied to a poppet valve, which opens or closes a valve by moving a valve shaft in an axial direction.

Note that combination, modification or omission of parts of embodiments described above may be made within the scope of the invention.

INDUSTRIAL APPLICABILITY

Because a fluid control valve according to this disclosure can improve the resistance to the residual heat of the valve-side housing that is heated by the fluid having a high temperature, the fluid control valve according to this disclosure can be preferably applied to, for example, the exhaust gas recirculation valve that deals with the exhaust gas having a high temperature.

REFERENCE SIGNS LIST 10 actuator unit; 11 motor; 20 driving force transmitting unit; 21 actuator-side-housing; 21A, 31A facing plane portion; 21a extension wall; 21b, 31a through-hole; 21c-1, 21c-2, 31d connection portion; 21d, 40a bolt-hole; 21e-1, 21e-2, 40b cutout portion; 22 bolt; 23 coolant passage; 23a passage opening; 30 valve unit; 31 valve-side-housing; 31b portion around valve shaft; 31c depression portion; 31e screw hole; 32 valve shaft; 33 valve; and 40 thermal insulating plate.

The invention claimed is:

1. A fluid control valve comprising:
a first housing including a fluid passage;
a valve provided in the first housing and configured to open or close the fluid passage;
an actuator unit for generating a driving force to open or close the valve; and
a second housing to which the actuator unit is attached and including a coolant passage through which a coolant fluid circulates, wherein
the first and second housings each include a facing plane portion facing one another and a connection portion disposed at an outer side region of the facing plane portion, the facing plane portions are connected to each other via the connection portions and a thermal insulating member with a space provided therebetween,
the facing plane portion of the first housing includes a depression portion that is recessed in a direction away from the facing plane portion of the second housing, the depression portion being in contact with no elements other than the first housing, and
a part of the thermal insulating member in contact with the connection portions has a concave shape, wherein
the second housing includes an extension wall extending from an outer peripheral portion of the facing plane portion that faces the first housing toward a direction opposite the actuator unit as a whole, and surrounding at least an upper end portion of the first housing.

2. The fluid control valve according to claim 1, wherein a part of the connection portion of the second housing has a depressed shape.

3. The fluid control valve according to claim 1 wherein the actuator unit actuates the valve with an actuator shaft extending between the first and second housings;
first housing being separated from the second housing in the area generally surrounding the shaft by a thermal insulating air gap that is enlarged by the depression portion to increase heat transfer resistance between the first and second housings.

4. A fluid control valve comprising:
a first housing including a fluid passage;
a valve provided in the first housing and configured to open or close the fluid passage, the valve having an axial portion;
an actuator unit for generating a driving force to open or close the valve; and
a second housing to which the actuator unit is attached and including a coolant passage through which a coolant fluid circulates, wherein
the first and second housings each include a facing plane portion facing one another and a connection portion disposed at an outer side region of the facing plane portion, the facing plane portions are connected to each other via the connection portions and a thermal insulating member with a space provided therebetween,
the facing plane portion of the first housing includes a depression portion that is recessed in a direction away from the facing plane portion of the second housing, the depression portion enclosing the axial portion of the valve, and
a part of the thermal insulating member in contact with the connection portions has a concave shape, wherein the second housing includes an extension wall extending from an outer peripheral portion of the facing plane portion that faces the first housing toward a direction opposite the actuator unit as a whole, and surrounding an upper end portion of the first housing.

5. The fluid control valve according to claim 4, wherein a part of the connection portion of the second housing has a depressed shape.

6. The fluid control valve according to claim 4 wherein the actuator unit actuates the valve with an actuator shaft provided as the axial portion of the valve and extending between the first and second housings;

first housing being separated from the second housing in the area generally surrounding the shaft by a thermal insulating air gap that is enlarged by the depression portion to increase heat transfer resistance between the first and second housings.

\* \* \* \* \*